April 7, 1970 S. K. WIEDMANN 3,505,573

LOW STANDBY POWER MEMORY CELL

Filed Sept. 30, 1968 2 Sheets-Sheet 1

INVENTOR
SIEGFRIED K. WIEDMANN

BY J. B. Kraft
ATTORNEY

United States Patent Office 3,505,573
Patented Apr. 7, 1970

3,505,573
LOW STANDBY POWER MEMORY CELL
Siegfried K. Wiedmann, Esslingen, Germany, assignor to International Business Machines Corporation, Armonk, N.Y., a corporation of New York
Filed Sept. 30, 1968, Ser. No. 763,870
Claims priority, application Germany, Oct. 5, 1967, 1,524,873
Int. Cl. H01l 19/00
U.S. Cl. 317—235 16 Claims

ABSTRACT OF THE DISCLOSURE

A monolithic memory cell formed by a pair of dual emitter transistors in a bistable circuit configuration, the cell being powered in a high current mode sufficient to maintain the circuit during operating periods, and a low current mode sufficient to maintain the circuit during storage intervals. The cell includes a pair of transistors formed in a substrate of a first type conductivity. The transistors comprise a pair of base regions in the substrate of a conductivity type opposite that of the substrate. A pair of diffused emitters is contained within each base region. The region of the substrate surrounding each base provides the collector for each of said transistors. The low current mode is provided by a constant power source applied to the collector regions through high resistivity substrate. A second power source is selectively applied to the collector regions through a low resistivity, opposite conductivity type region in the substrate intermediate the pair of transistors. The junction of the intermediate region and the substrate proper acts as a diode to switch the current being applied to the collector to the high current from the second source through the parallel low resistivity path.

BACKGROUND OF THE INVENTION

Field of the invention

This invention relates to memory arrays, particularly monolithic memory arrays formed from a plurality of memory cells comprising bistable circuits of cross-coupled transistors.

Description of the prior art

Memory storage cells employing a pair of transistors in a bistable or flip-flop circuit configuration have been utilized for information or data storage in data processing systems. Memory storage cells and circuits are generally operated at high speeds for very short time intervals. However, during such periods of operation, the cells require considerable power. On the other hand, during the nonoperative time or the storage intervals which are of relatively great duration, the power requirements necessary to maintain or store information in the cell are relatively small. The art has recognized the desirability of minimizing the power consumed by memory storage arrays during the period of storage. The need for such power consumption becomes increasingly critical as the microminiaturization of memory circuits produces ever increasing circuit and cell density per unit of space. The power consumption produces heat which becomes increasingly difficult to dissipate in dense circuit configurations, such as monolithic memory arrays. Unless dissipated or minimized, the heat is destructive of the circuit elements. One approach to the minimization of power consumption during the storage or nonoperative periods of the cells may be referred to as "bilevel powering." That is, during storage periods, all of the cells are provided with power necessary to provide a low current mode sufficient to maintain the stored information within the cells. When a particular cell is to be operational, i.e., information is to be written into or read out of the cell, the cell is selectively powered to the high current mode required for the operation.

In order for bilevel powering to be advantageously utilized in monolithic memory structures, the problem must be faced of how to provide the monolithic memory array with additional circuitry necessary for such bi-level powering without significantly decreasing the density of memory cells per unit area.

SUMMARY OF THE INVENTION

Accordingly, it is an object of this invention to provide a monolithic memory array in which the cells are selectively provided with high and low currents during the storage and operative modes, respectively, without any significant decrease in cell density.

It is a further object of this invention to provide a unique memory cell structure capable of such high and low current states.

It is still a further object of this invention to provide a monolithic memory cell having unique means for switching from the high to low current states.

It is yet another object of this invention to provide a unique circuit for simultaneously selectively addressing memory cells which are to be operative and the selected cells to the high current state.

It is an even further object of this invention to provide an integrated circuit structure comprising a pair of spaced transistors utilizable for selectively powering the transistors at the current levels.

The above and other objects of the present invention are accomplished by the integrated monolithic memory structure of the present invention.

The storage cells in the memory array of the present invention are formed in a substrate of one type conductivity, preferably an epitaxial layer of relatively high resistivity. The cells comprise a transistor pair cross-coupled in a bistable configuration, i.e., the base of each transistor is coupled to the collector of the other transistor. The transistor pair comprises a pair of spaced base regions of opposite type conductivity extending from the surface of the substrate to form a pair of spaced base-collector junctions. Emitters of the transistors extend from the substrate surface enclosed within the base regions. The collector regions of the transistors are not sharply defined. In effect, the regions of the substrates abutting the bases at the base-collector junctions provide the collector regions; the inherent resistivity of the substrate between the spaced transistors serves to isolate the transistors from each other. At least one region of the opposite type conductivity extends from the surface of the substrate at a position intermediate the base-collector junctions of the two transistors. This intermediate region has a lower resistivity than the substrate. Utilizing this structure, the cell may be powered at two levels:

(1) Power providing the low current mode necessary to maintain stored information, and (2) Power providing the high current mode to the cell required for reading and writing operations involving the specific cell.

A pair of power sources connected to each transistor via parallel conductive paths to the collector of each transistor provides such bilevel powering. A first electrical power source is applied to the collector of each transistor through a contact to the substrate proper. This provides a high resistivity path through the substrate proper to the collector regions of each transistor. A second electrical power source is selectively applicable to the transistors through a contact to the lower resistivity intermediate region. This provides a parallel, relatively low resistivity path to each transistor via the low resistivity intermediate region and the junction between said intermediate region and the substrate proper which acts as a diode. A power source applied to the transistors via the high resistivity path is continuously applied and, because of such high resistivity, provides a relatively low current which is just sufficient to maintain the stored information within the cell. When the cell is selected to be operational, power is applied from the second source to the low resistivity region. This renders conductive the diode formed by the junction of the intermediate region and the substrate proper, thereby providing a low resistivity, high current path to the transistors of the cells.

In accordance with another aspect of this invention, I have found that the structure of the present invention permits the power source, which is selectively applied to provide the high current mode, to be also utilized as the power source for selectively addressing the cells to render them operational for writing or reading information. Such an embodiment preferably employs duel emitter transistors in which one of the emitters in each transistor are interconnected. The power source providing the high current is connected to the interconnected emitters to provide the circuit for simultaneously addressing and high current mode powering of the cell.

The foregoing and other objects, features and advantages of the invention will be apparent from the following more particular description and preferred embodiments of the invention as illustrated in the accompanying drawings.

DESCRIPTION OF THE PREFERRED EMBODIMENTS

Figure 1B:
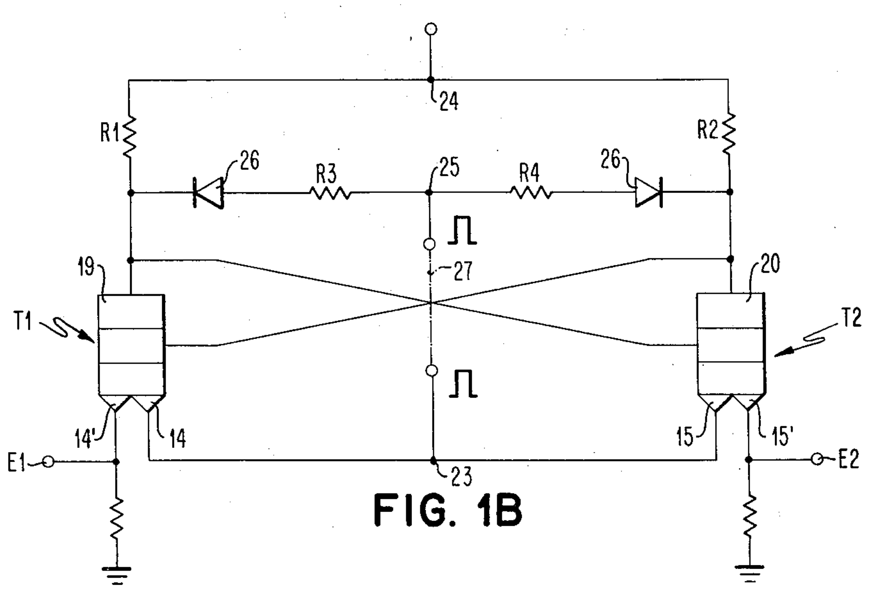
FIG. 1B is an electrical, schematic diagram of the circuit of the cell structure in FIG. 1.
Figures 1, 1A:
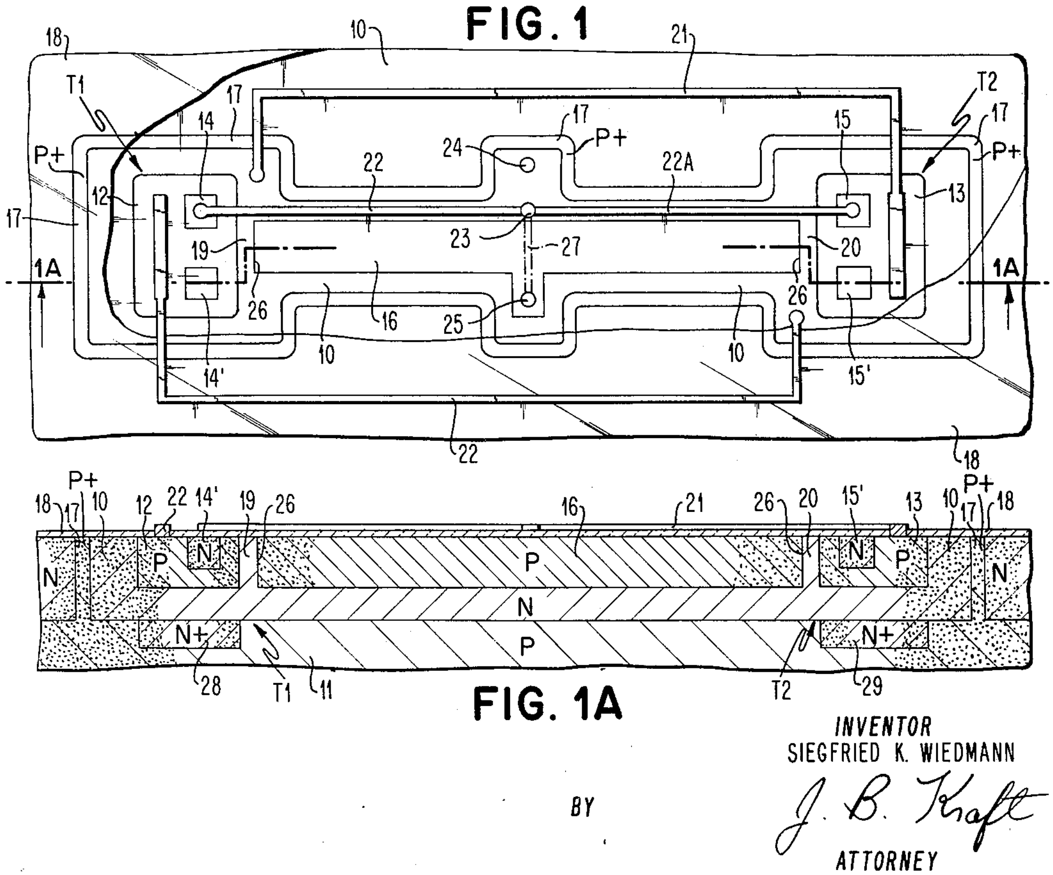
FIG. 1 is a planar, diagrammatic view of a section of a memory array containing a cell in accordance with one embodiment of the present invention.
FIG. 1A is a diagrammatic, cross-sectional view of the structure of FIG. 1 along line 1A—1A.

The cell structure shown in FIGS. 1 and 1A is now being described. The structure is fabricated utilizing diffusion and metallization techniques conventional in the art. Typical fabrication techniqeus of this type are described in co-pending application, Ser. No. 539,210, Agusta et al., filed Mar. 31, 1966.

The cell comprises transistors T1 and T2 formed in a high resistivity, N conductivity type semiconductor substrate 10. The substrate is preferably an epitaxial layer of silicon formed on a P type conductivity semi-conductor support 11. The N conductivity type epitaxial layer preferably has a resistivity of 10,000 ohms per square. The transistors contain base regions 12 and 13 of P type conductivity and a pair of emitter regions 14 and 14' and 15 and 15' of N type conductivity respectively enclosed within each base region. The base regions have a $C_0$ of $2\times10^{19}$ cm.$^{-3}$ and a resistivity of 160 ohms per square, and the emitter areas have a $C_0$ of $10^{21}$ cm.$^{-3}$ and a resistivity of 30 ohms per square. A P type conductivity region 16, having a lower resistivity than the epitaxial layer, is disposed intermediate the transistor pair. Region 16 may be conveniently formed in the same diffusion step as base regions 12 and 13; the resistivity of region 16 would then be 160 ohms per square. The memory cell is isolated by a P+ isolation diffusion 17. The surface of substrate 10 is covered by a coating 18 of a conventional insulating material such as silicon dioxide. The regions 19 and 20 of substrate 10, abutting bases 12 and 13, function as collector regions for transistors T1 and T2. For best results, subcollector regions 28 and 29, formed in support 11 respectively below the transistors T1 and T2, are utilized. These subcollectors are N+ having a low resistivity of about 10 ohms per square. They are formed in the conventional manner by a preliminary diffusion into support 11 as described in copending application Ser. No. 539,210. The collector of transistor T1 is coupled to the base 13 of collector T2 by metallic interconnector 21 passing over the surface of silicon dioxide layer 18. Likewise, the collector of transistor T2 is coupled to the base 12 of transistor T1 by metallic interconnector 22. This provides the cross-coupling for the storage cell. Metallic interconnector 22A couples one of the emitters 14 of transistor T1 with one of the emitters 15 of transistor T2. Power may relatively be applied to emitters 14 and 15 from a source not shown to terminal 23 on interconnector 22A.

In order to consider the operation of the memory cell, reference is made to the schematic representation of the cell in FIG. 1B. Before considering the application of power to the cell, the manner of storage in a dual emitter bistable memory cell should be considered. In the non-operational or storage state, assume a bit or "one" is being stored in transistor T1. The voltage at terminal 23, and consequently on emitters 14 and 15, is zero volts. The other emitters 14' and 15' are maintained at a small voltage above zero, e.g., in the order of from .5 to 1 volt. A power source not shown maintains terminal 24 at a voltage sufficiently high to maintain the minimal current through the active transistor T1 necessary to maintain the stored bit in said transistor. Terminal 24 is coupled to collectors 19 and 20 via the intermediate, high resistivity epitaxial layer 10 which is represented by R1 and R2 in FIG. 1B. The voltage applied to terminal 24 is in the order of from 3 to 4 volts. Accordingly, transistor T1 is conducting to store a bit via emitter 14 which is at zero potential. Emitter 14', which is at a potential slightly above zero, is effectively nonconductive.

When the cell is selected to be operative, i.e., information is to be read out of or written into the cell, a power source applies an address pulse to terminal 23 of sufficient magnitude (e.g., about 3 volts) to render ineffective the conductive path through emitter 14. As the conductive path through emitter 14 is blocked, transistor T1 starts to conduct via the path through emitter 14'. The cell is then capable of being read through terminals E1 and E2 respectively connected to emitters 14' and 15'. Since transistor T1 is in the conductive state indicative of the storage of a bit, this will be readable via terminal E1. On the other hand, since transistor T2 is not in such a conductive state, the absence of a bit would be readable at terminal E2. Likewise, information may be written into the cell via terminals E1 or E2 during the application of an address pulse to terminal 23; for example, if the bit stored in transistor T1 is to be removed or transferred, a pulse is applied to terminal E1 from a source not shown which has a voltage of about the same magnitude as the address pulse being applied to terminal 23. Since emitters 14 and 14' of transistor T1 and emitter 15 of transistor T2 are blocked, transistor T2 starts to conduct via emitter 15' due to the bistable cross-coupling of the transistors. This effectively transfers the bit from transistor T1 to transistor T2.

Because the low current provided to the cell by the power source applied to the terminal 24 through high resistivity regions R1 and R2 is insufficient for the transistors in the cell to operate during the previously described read-out and write-in operations of a selectively addressed cell, the structure of the present invention is provided with means for powering the transistors in the cell to a high current mode during such operational stages. At the same time that an address pulse is applied to terminal 23, power is applied from a source not shown to terminal 25 to produce a voltage of sufficient magnitude to render conductive the junction 26 between low resistivity region 16 and the epitaxial substrate in the collector regions of the respective transistors. Junction 26 is represented in FIG. 1B as diodes 26. There is thus provided a low resistivity current path across the respective transistors from terminals 25 to ground which bypasses the parallel voltage path from terminal 24 to provide the high current necessary for the transistors during the operational state of the cell. When the operation on the cell is completed, the power source to terminal 25 is removed, diodes 26 are thereby rendered nonconductive and the low current path from terminal 25 through resistors R1 and R2 respectively is resumed. The voltage pulse provided at terminal 25 by the power source has a magnitude in the order of from 3 to 4 volts. Since this is applied at the same time as the address pulse to terminal 23 and is of the same order of magnitude, terminal 25 may be coupled to terminal 23. Thus, a pulse provided from a single power source may be simultaneously applied to terminals 23 and 25 to simultaneously address the selected cell and provide power for the high current mode in the selected cell. Such an operational coupling is indicated by interconnector 27 which is drawn in phantom lines.

The operation of the present invention is dependent on the resistivity of the intermediate region being substantially lower than that of the epitaxial substrate. Preferably, the intermediate region 16 has a resistivity of from 100 to 400 ohms per square, while the substrate has a resistivity of from 1,000 to 20,000 ohms per square.

Figure 2A:
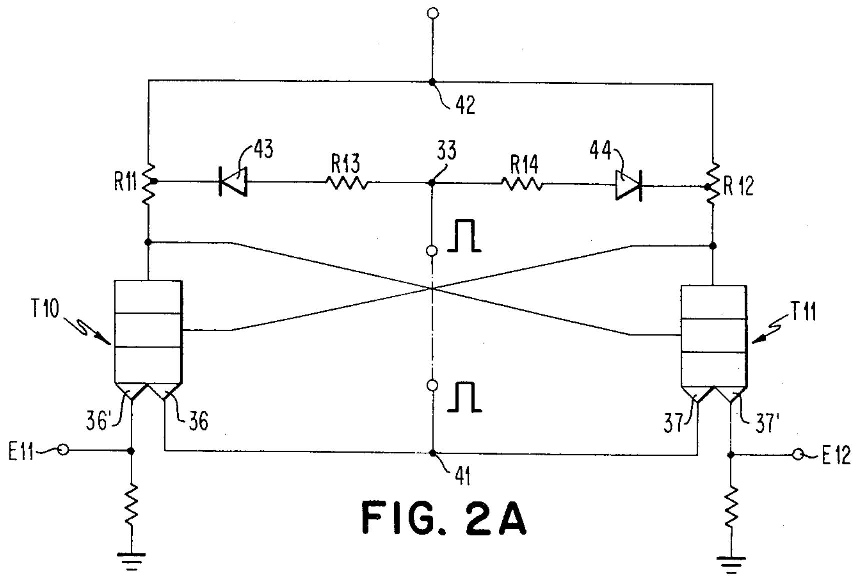
FIG. 2A is an electrical, schematic view of the embodiment of FIG. 2.
Figure 2:
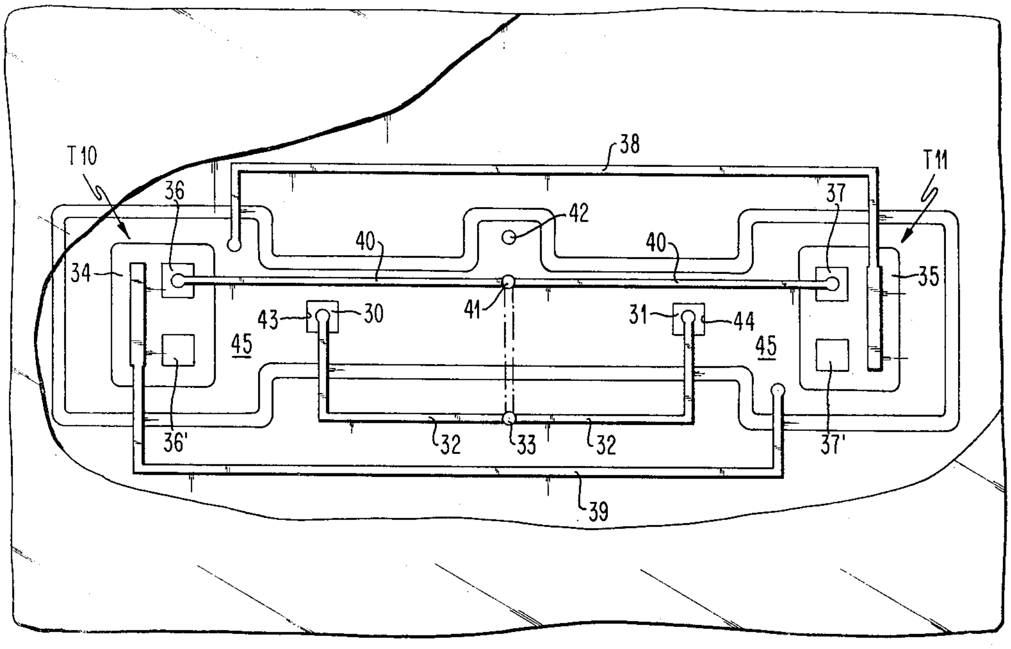
FIG. 2 is a planar, diagrammatic view of a section of a memory array containing a cell in accordance with a modified embodiment of the present invention.

A modified embodiment of the cell structure of the present invention is shown in FIG. 2 and represented in FIG. 2A. This embodiment contains essentially all of the elements in the embodiment of FIG. 1 except that a pair of intermediate areas 30 and 31 of P type conductivity are utilized instead of the single intermediate area 16 of the embodiment of FIG. 1. Intermediate areas 30 and 31 are coupled by means of metallic interconector 32 to terminal 33 which is the equivalent of terminal 25 in the embodiment of FIG. 1. Otherwise, transistors T10 and T11 are respectively equivalent to the transistor pair in the structure of FIG. 1. The transistors respectively include bases 34 and 35 and emitter pairs 36, 36′ and 37, 37′ which are the equivalent of the elements of the structure shown in FIG. 1. Likewise, interconnectors 38 and 39, cross-coupling the transistors, function in the same manner as the like interconnectors in FIG. 1. Also, interconector 40 couples emitters 36 and 37 in the same manner as the equivalent interconnector in FIG. 1. Terminal 41 is used in the selective addressing of the cell and the power for the low current storage mode of the cell is provided via terminal 42. The terminals E11 and E12 function in the same manner as terminals E1 and E2 in FIG. 1B.

The primary difference in operation in the modified structure shown in FIG. 2 from the operation of the structure shown in FIG. 1 is that during the high current mode of the transistor, power applied to terminal 33 renders conductive the diodes 43 and 44 provide by the junction between intermediate low resistivity regions 30 and 31 respectively with epitaxial substrate 45. In the structure of FIG. 2, the selectively applied high current path includes a portion of high resistivity epitaxial region 45. However, the path still bypasses or shunts a substantial portion of the parallel low power path through high resistitivity epitaxial region 45. This is represented in the schematic circuit in FIG. 2A wherein R11 and R12 respectively represent the high resistivity substrate, a portion of which is bypassed by the high current path through low resistivity regions 30 and 31 respectively represented as R13 and R14 and diodes 43 and 44.

While the preferred embodiments have been represented in the form of a pair of NPN transistors, the structure of this invention will function in the same manner if the conductivity types of the various regions are reversed from N to P and P to N.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An integrated semiconductor structure comprising:
- a substrate of one type conductivity;
- first and second spaced regions of opposite type conductivity extending from one surface of the substrate to form first and second base-collector junctions of first and second transistors;
- first and second regions of said one type conductivity extending from said surface enclosed respectively within said first and second opposite type conductivity regions to form the emitter-base junctions of said first and second transistors;
- at least one additional region of said opposite type conductivity extending from the surface of the substrate intermediate said first and second base-collector junctions;
- a metallic contact connected to said intermediate region; and
- an electrical power source applied to said transistors through said contact, whereby the intermediate region provides a connection for said power source to the collector regions of said transistors including the resistance of said intermediate region and the junction between the intermediate region and the substrate proper which acts as a diode.

2. The structure of claim 1 wherein said substrate is an epitaxial layer.

3. The structure of claim 1 comprising a spaced pair of said additional intermediate regions, said power source being applied through a pair of interconnected contacts to the regions.

4. In an integrated monolithic memory array a storage cell comprising:
- a substrate of one type conductivity;
- first and second spaced base regions of opposite type conductivity extending from one surface of the substrate to form first and second base-collector junctions of first and second transistors, the regions of the substrate abutting the bases at said junctions providing the collector regions for said transistors;
- first and second emitter regions of said one type conductivity extending from said surface enclosed respectively within said first and second opposite type conductivity regions;
- a pair of interconnections respectively coupling the base of the first transistor to the collector of the second transistor and the base of the second transistor to the collector of the first transistor to form a bistable storage cell capable of storing one binary bit of information;
- at least one additional region of said opposite type conductivity, having a lower resistivity than the substrate, extending from the surface of the substrate intermediate said first and second base-collector junctions;
- a metallic contact connected to said one type conductivity substrate between the first and second transistors;
- a second metallic contact connected to said intermediate region of opposite type conductivity;
- a first electrical power source applied to said transistor through said first contact, whereby the substrate proper provides a connection for said power source to the collector regions of said transistors; and
- a second electrical power source selectively applicable to said transistors through said second contact, whereby the intermediate region provides a low resistivity connection of said second power source to the collector regions of said transistors including the resistance of said intermediate region and the junction between the intermediate region and the substrate proper which acts as a diode in parallel with the higher resistivity connection of the first power source.

5. The memory array of claim 4 further including means for selectively addressing said cell and for writing information into and for reading information out of said addressed cell.

6. The memory array of claim 5 wherein said second power source is selectively applied simultaneously with the addressing of the cell.

7. The memory array of claim 4 wherein said substrate is an epitaxial layer.

8. The memory array of claim 4 comprising a spaced pair of said additional intermediate regions, said second power source being applied to a pair of interconnected contacts to the regions.

9. In an integrated monolithic memory array a storage cell comprising:

a substrate of one type conductivity;

first and second spaced base regions of opposite type conductivity extending from one surface of the substrate to form first and second base-collector junctions of first and second transistors, the region of the substrate abutting the bases at said junctions providing the collector regions for said transistors;

a first pair of spaced emitter regions of said one type conductivity extending from said surface enclosed within said first opposite type conductivity region;

a second pair of spaced emitter regions of said one type conductivity extending from said surface enclosed within said second opposite type conductivity region;

a pair of interconnections respectively coupling the base of the first transistor to the collector of the second transistor and the base of the second transistor to the collector of the first transistor to form a bistable storage cell capable of storing one binary bit of information;

at least one additional region of said oposite type conductivity having a lower resistivity than the substrate extending from the surface of the substrate intermediate said first and second base-collector junctions;

a metallic contact connected to said one type conductivity substrate between the first and second transistors;

a second metallic contact connected to said intermediate region of opposite type conductivity;

a first electrical power source applied to said transistors through said first contact, whereby the substrate proper provides a connection for said power source to the collector regions of said transistors;

a second electrical power source selectively applicable to said transistors through said second contact, whereby the intermediate region provides a low resistivity connection of said second power source to the collector regions of said transistors including the resistance of said intermediate region and the junction between the intermediate region and the substrate proper which acts as a diode in parallel with the higher resistivity connection of the first power source;

an interconnection coupling one of the emitters of the first transistor with one of the emitters of the second transistor; and means for selectively addressing said storage cell comprising a power source selectively applicable to the interconnection coupling said emitter regions.

10. The memory array of claim 9 wherein the second metallic contact is coupled to the interconnection between said pair of emitters and said second power source is utilized as the address power source.

11. The memory array of claim 9 further including means for writing information into and for reading information out of said cell when addressed.

12. The memory array of claim 11 wherein said means for writing information into and for reading information out of the addressed cell are connected to each of the nonconnected emitters in each transistor.

13. The memory array of claim 9 wherein said substrate is an epitaxial layer.

14. The memory array of claim 9 comprising a spaced pair of said additional intermediate regions, said second power source being applied to a pair of interconnected contacts to the regions.

15. In a low standby power memory cell comprising, a pair of transistors each having two emitters, said transistors being interconnected to form a bistable circuit such that each storage cell is capable of storing one binary bit of information; a first electrical power source constantly applied to each of said transistors in a high resistivity path through the respective collector region of said transistors, and a second electrical power source selectively applied to said transistors by diode switching means in a parallel low resistivity, high current path through the respective collector regions of said transistors, the improvement comprising connecting said high power source to one of the emitters on each transistor to selectively address the storage cell simultaneously with the application of high current to the transistors in the cell.

16. The low standby power memory cell of claim 15 further including means for writing information into and for reading information out of the addressed cell connected to the other emitter in each transistor.

References Cited

UNITED STATES PATENTS

| | | | |
|---|---|---|---|
| 3,218,613 | 11/1965 | Gribble et al. | 307—291 |
| 3,359,432 | 12/1967 | Miller | 317—235 |

JERRY D. CRAIG, Primary Examiner

U.S. Cl. X.R.

340—173; 307—213, 291, 279, 303